May 27, 1941.　　　　E. L. MILLER　　　　2,243,569
INDEPENDENTLY ROTATABLE DUAL WHEEL CONSTRUCTION
Filed July 5, 1939　　　3 Sheets-Sheet 1
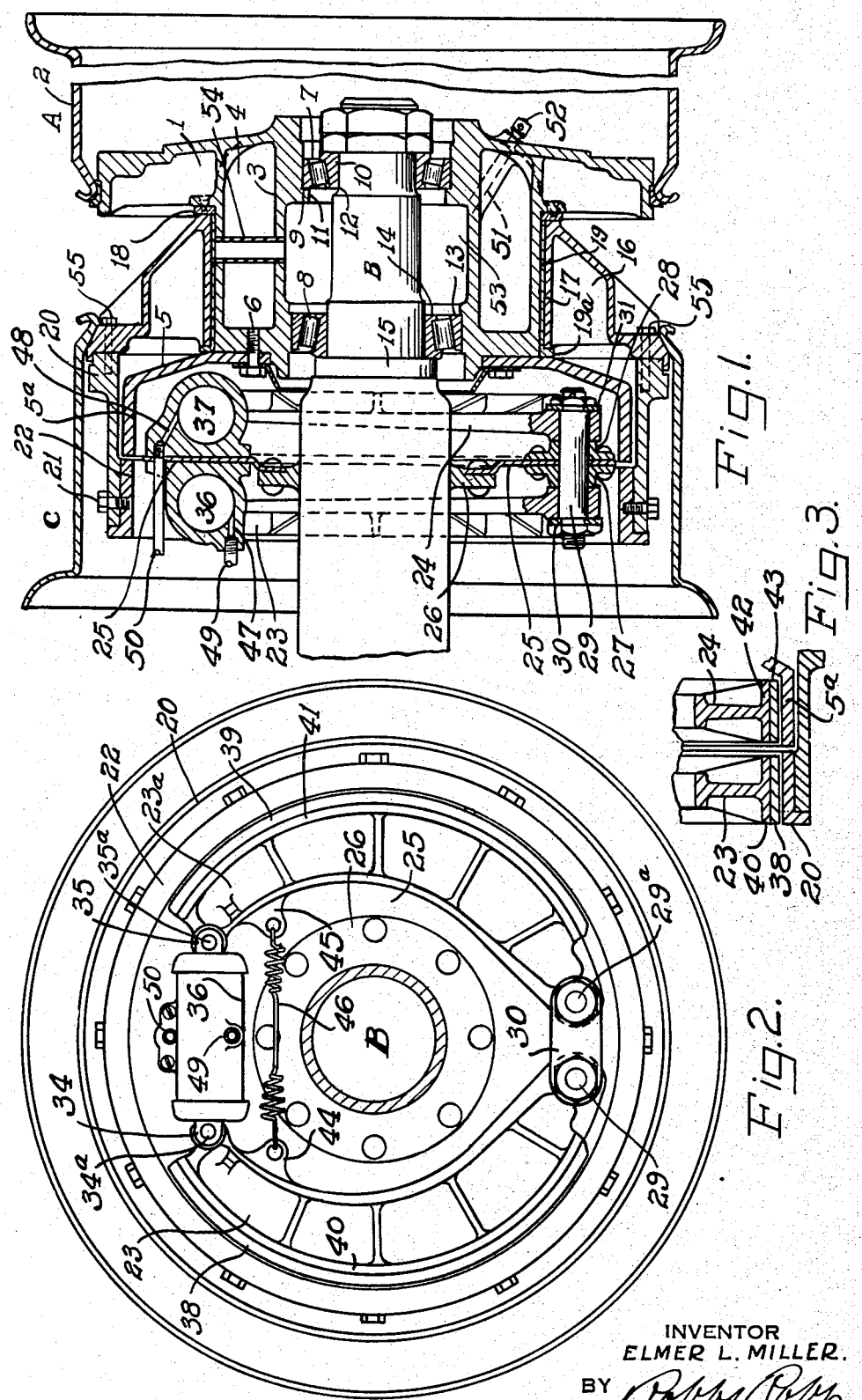
INVENTOR
ELMER L. MILLER.
BY
ATTORNEYS INVENTOR
ELMER L. MILLER.
BY Robb & Robb
ATTORNEYS May 27, 1941.  E. L. MILLER  2,243,569
INDEPENDENTLY ROTATABLE DUAL WHEEL CONSTRUCTION
Filed July 5, 1939   3 Sheets-Sheet 3

INVENTOR
ELMER L. MILLER.
BY
ATTORNEYS

Patented May 27, 1941

2,243,569

UNITED STATES PATENT OFFICE 2,243,569

INDEPENDENTLY ROTATABLE DUAL WHEEL CONSTRUCTION

Elmer L. Miller, Dayton, Ohio, assignor to The Dayton Steel Foundry Company, Dayton, Ohio, a corporation of Ohio Application July 5, 1939, Serial No. 282,940

13 Claims. (Cl. 188—18)

The present invention relates to dual wheel construction of the type in which units comprising two independently rotatable wheels are employed at each side of the vehicle upon which they are used.

Dual wheel or double wheel units comprising two wheels interconnected for rotation as a single wheel have been largely employed in connection with heavy duty vehicles such as trucks, motor buses and commercial trailers for sometime. The use of such dual wheel units is advantageous from the standpoint of greater supporting surface secured and reduction in the size of individual tires required. Wheel units of this type are subject to the production of a great amount of friction and consequent wear upon the tires because the wheels rotate as one wheel and one or the other of the wheels is dragged over rather than rotates upon the supporting surface during certain conditions of travel. The provision of a dual wheel unit comprising independently rotatable wheels reduces friction; eliminates the dragging of one tire when the vehicle is traveling upon uneven surfaces or is turning; and consequently reduction in fuel consumption and depreciation is effected.

In the construction of wheel units comprising independently rotatable wheels, difficulty has been encountered in the provision of efficient brake applying means for each of the individual wheels of the unit.

Another difficulty is to provide a construction in which adequate supporting bearing surface for each of the wheels may be secured without extending the width dimension of the unit since it is highly desirable to maintain the unit as compact as possible.

The present invention provides a construction of independently rotatable wheel unit which comprises a minimum number of parts, provides adequate rotatable bearing surface for each of the wheels while maintaining compactness of the unit, and provides a very simple and efficient brake arrangement in which the brake elements rotating with each wheel of the unit are positioned adjacent one another and at the inboard side of the inboard wheel of said unit, enabling the brake applying means for both wheels to be compactly located, making the same readily accessible for direct connection to the actuating means therefor, eliminating duplication of parts, and reducing cost of manufacture.

In carrying my invention into practice, the structure may assume different forms but I have found the two forms specifically disclosed herein to be most satisfactory for the purposes intended.

In one form of the invention herein disclosed provision is made for the arrangement of the braking means such that the separate brake elements rotating with each wheel are positioned relatively close together and inside of the inner wheel of the dual wheel unit enabling employment of very compact brake applying means for applying braking action to both drums separately and simultaneously. The novel brake applying means of this form of the invention makes provision for the simultaneous application of separate brake shoes to each of the brake drums of respective wheels of the unit. The use of separate brake shoes for application to each of the separate drums is advantageous because in use the cooperating braking elements for one wheel of a dual wheel unit will not always wear uniformly with the cooperating braking elements of the other wheel of said unit. This is due to the fact that under certain conditions of travel one of the wheels of a unit does not rotate as much as the other wheel of said unit and consequently when the vehicle is braked under such conditions the cooperating braking elements of one of the wheels will not be subjected to the same amount of wear as the corresponding cooperating braking elements of the other wheel of the unit.

Thus for the same reasons that it is desirable in the first instance to provide a dual wheel comprising independently rotatable wheels, namely, the avoidance of undue friction and consequent wear caused thereby, it is likewise desirable to provide independence of action of the respective cooperating braking elements for each wheel of the unit under certain conditions. At the same time, however, it is equally desirable to apply the braking action to both wheels simultaneously. For these reasons the construction of this form of the brake applying means of the present invention provides cooperating brake elements for each wheel of a unit which act independently of, though simultaneously with, the cooperating brake elements of the other wheel of said unit, and the said braking elements of each wheel are automatically equalized to compensate for unequal wear upon the parts thereof.

In the other form of the invention disclosed specifically herein, means comprising cooperating friction discs, certain of which are stationary respecting the vehicle frame, and certain of which rotate with the respective wheels of the dual wheel unit, has been substituted for the usual brake means comprising cooperating brake shoes and brake drums. In this latter form of the invention each of the wheels of the dual wheel unit is provided with a friction disc fixed thereto to rotate therewith, which discs are located proximate to one another at the inboard side of the inboard wheel. Non-rotating friction discs, maintained stationary respecting the frame of the vehicle, are provided for cooperation with the aforementioned rotating discs and novel means is provided for enabling frictional engagement of the rotating and non-rotating discs by a camming action of cooperating parts respectively associated with the rotating and non-rotating discs.

To obtain equalized operation of the brake means, the camming action is effected at points equally spaced respecting the paths of movement of the rotating discs and novel means interconnecting the instrumentalities for performing the camming action at such points is provided, which latter means is readily accessible for connection to actuating means provided on the frame of the vehicle.

In the dual wheel units of the present invention, one of the wheels is provided with an extended hub portion which serves as the bearing surface for the other wheel of said unit and around which said other wheel revolves.

In other words, instead of requiring both wheels to be journaled upon the same axle in spaced relation, or requiring the provision of a separate member rotatable about the common axle upon which to journal one of the wheels, and which is connected to the other wheel of the unit, the present invention provides an extended hub portion for one of the wheels which is integral therewith and about which the other wheel is rotatable.

In the constructions of the present invention provision is also made for the lubrication of the relatively movable adjacent bearing surfaces of the respective wheel hubs from a lubricant reservoir located interiorly of one of the said wheel hubs.

The details of the invention will now be more fully described in conjunction with the drawings, in which:

Figure 1 is a vertical sectional view of a wheel unit embodying one form of my invention.

Figure 2 is a plan view of the braking arrangement utilized therein.

Figure 3 is a partial horizontal sectional view through the brake means of the form disclosed in Figures 1 and 2, showing the relation of the respective brake shoes to their respective inner and outer wheel brake drums.

Figure 4:
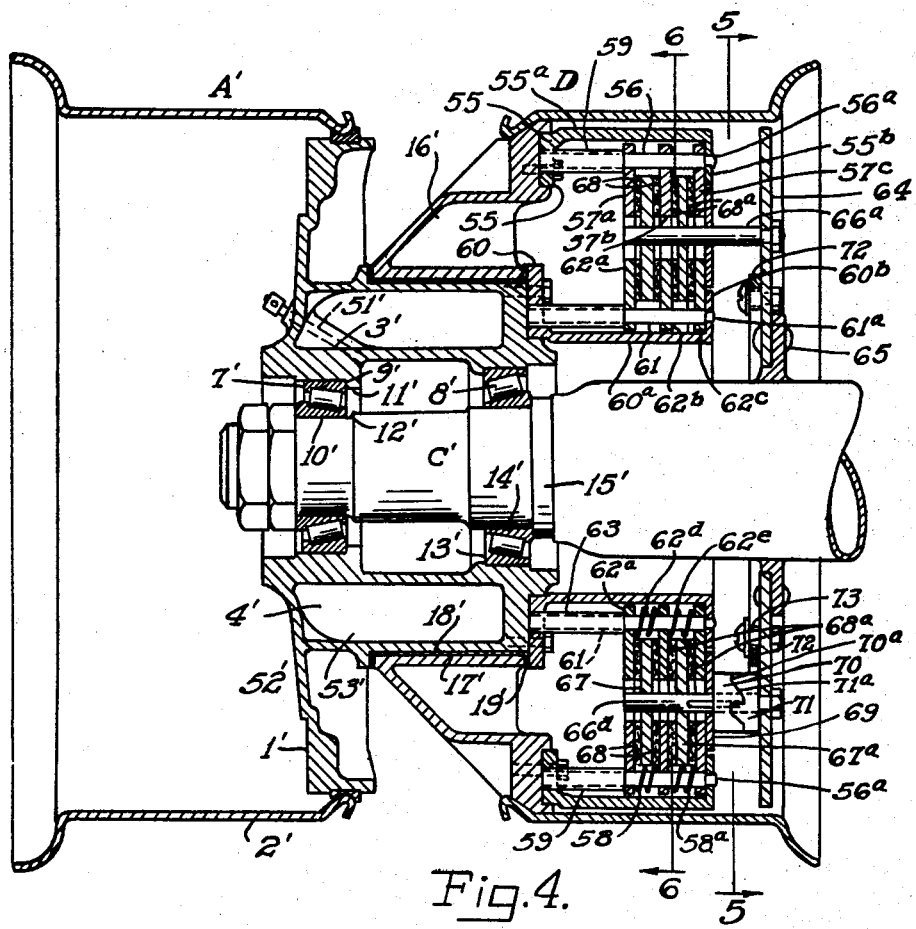
Figure 4 is a sectional view of a wheel unit embodying another form of my invention.

In the embodiment of the invention shown in Figures 1 to 3 of the drawings, the dual wheel unit consists of two independently rotatable wheels, one of which is mounted to rotate about the wheel end of the axle of a vehicle to which the unit is applied and comprises a broad hub portion around which the other wheel of the unit rotates.

The letter A designates generally the outer wheel of the unit; B represents the axle of a vehicle not shown; and C represents the inner wheel of the unit which rotates around the hub of the outer wheel.

The outer wheel of the unit comprises a spider 1 to which is detachably secured a tire rim 2, said spider being formed with a horizontally extending hub portion 3 formed integral with said spider and having an annular hollow chamber 4.

To the inner end of the hub portion 3 of the spider 1 is secured a brake drum 5, as by bolts 6. The wheel A is mounted for rotation about the axle B upon spaced sets of roller bearings 7 and 8 supporting the hub 3 rotatably upon the axle B. The bearings 7 are positioned near the wheel end of the hub and operate between cones 9 and 10, the outer cone 9 being tightly seated against the inner wall of the hub and engaging an annular flange 11 thereon for proper positioning of the same axially, and the inner cone 10 being tightly fitted around the axle B.

The other bearings 8 supporting the hub 3 upon the axle B are positioned near the inner end of hub 3 and operate between cones 13 and 14, the outer cone 13 being tightly seated against the inner wall of the hub 3, and the inner cone 14 being tightly fitted around the axle B and engaging an annular shoulder 15 on the axle B for positioning the bearings axially.

The inner wheel C comprises a spider 16 having a wide central bearing portion 17 journaled upon the hub portion 3 of the wheel A for supporting the inner wheel C rotatably upon the said hub portion 3 of the outer wheel A.

A suitable bearing ring 18 is secured to the spider 1 adjacent its hub portion 3 and engages the outer edge of the hub portion 17 of the inner wheel spider 16. A sleeve bearing 19 having a flange 19a is fitted on the hub portion 17 so that the flange 19a is positioned between the inner edge of the hub portion 17 of the inner wheel spider 16 and the brake drum 5. The bearings 18 and 19 serve to properly position the wheel C upon the hub 3 of the outer wheel A.

Secured to the inner wheel spider 16, as by bolts 55, is a brake drum 20, which is of greater diameter than the peripheral brake shoe engaging portion 5a of the outer wheel brake drum 5. Secured to the inner wheel brake drum 20, as by bolts 21, is a peripheral brake shoe engaging liner 22 of the same diameter as the corresponding portion 5a of the brake drum 5 and concentric therewith.

Brake applying means, now to be described, is positioned interiorly of the inner wheel C and comprises a pair of brake shoes 23 and 23a, adapted to engage the liner 22 of the outer wheel brake drum 20, and a pair of brake shoes, only one of which is seen in Figure 1, at 24 adapted to engage the flange 5a of the outer wheel brake drum 5.

Each set of brake shoes is pivotally connected to a brake backing plate 25 so that said sets will be supported at opposite sides of said backing plate. The backing plate 25 is fastened to a collar 26, non-rotatably secured to the axle B. The brake applying means for the inner wheel brake drum is shown more in detail in Figure 2, which is an end view looking toward said brake applying means. The brake applying means for the outer wheel brake drum is substantially identical with that for the inner wheel brake drum.

Fastened to opposite sides of the brake backing plate 25 are bearing members 27 and 28 in which are journaled pivot pins 29 and 29a. Attached to said pivot pins 29 are links 30 and 31. The brake shoes 23 and 23a of the set adapted to engage the inner wheel brake drum 20 are pivotally connected to the pivot pins 29 and 29a respectively at the inboard side of backing plate 25. Likewise, the brake shoes 24 of the set adapted to engage the outer wheel brake drum 5 are pivotally connected to the pivot pins 29 and 29a at the outboard side of said backing plate 25.

The upper ends of the brake shoes 23 and 23a are pivotally connected to the outer ends of piston rods 34 and 35, as at 34a and 35a respectively. The piston rods 34 and 35 are respectively connected to oppositely acting pistons reciprocable in the fluid cylinder 36. Similarly, the upper ends of the brake shoes 24 are pivotally connected to the outer ends of piston rods respectively connected to oppositely acting pistons reciprocable in the fluid cylinder 37. The fluid cylinders 36 and 37 are secured to opposite sides of the brake backing plate 25, as seen in Figure 1. The brake shoes 23 and 23a are provided with brake linings 38 and 39 respectively secured to the flanged portions 40 and 41 respectively of said brake shoes 23 and 23a, and engageable with the liner 22 of the outer wheel brake drum 20. Similarly, the brake shoes 24 are provided with flanged portions 42 to which are secured brake linings 43, engageable with the peripheral portion 5a of the inner wheel brake drum 5.

The brake shoes 23 and 23a are provided with lugs 44 and 45, as are also the brake shoes 24, to which lugs the opposite ends of spring means 46 are connected for normally maintaining the brake shoes retracted from drum-engaging position until expanded thereagainst by operation of the pistons in the cylinders 36 and 37 when the brake means is actuated by the operator of the vehicle.

The fluid pressure cylinders 36 and 37 are of the conventional type, provided with two oppositely acting pistons whose piston rods extend through the opposite ends of the cylinders, as indicated at 34 and 35 in Figure 2. The said fluid pressure cylinders 36 and 37 are provided with inlet ports 47 and 48 respectively to which branches 49 and 50 of the fluid pressure line are respectively connected in the usual manner. The ports 47 and 48 are positioned at the centers of their respective cylinders so as to admit fluid to said cylinders between the inner ends of the oppositely acting pistons operating therein.

In operation, when the brakes are applied by the operator of the vehicle, fluid is admitted to the cylinders 36 and 37 through the branches 49 and 50 of the fluid line, causing the oppositely acting pistons in said cylinders to be moved outwardly away from their normally central positions therein and causing the brake shoes to be expanded in the direction of the brake shoe engaging portions 5a and 22 of the outer wheel brake drum 5 and the inner wheel brake drum 20 respectively. When the brake means is so operated, the brake linings 38 and 39, secured to the brake shoes 23 and 23a, will frictionally engage the peripheral portion 22 of the brake drum 20 to resist rotation of the inner wheel C. And likewise, the brake lining 43 secured to the flanged portions 42 of the brake shoes 24 will frictionally engage the flanged portion 5a of the brake drum 5 to resist rotation of the outer wheel A.

The hub portion 3 of the outer wheel A is provided with a passage 51 leading interiorly thereof and to the outer end of which is connected a lubricant fitting 52. The space 53 between the inner wall of the hub 3 and the axle B comprises a lubricant reservoir which may be supplied with lubricant through the passage 51 to keep the bearings 8 and 9 constantly lubricated.

Extending through the hollow portion 4 of the hub 3 is a grease or oil pipe 54 by which lubricant from the reservoir 53 may be supplied to the adjacent bearing surfaces of the respective outer and inner wheel hubs 3 and 17.

From the above description it will be seen that this form of the invention provides a construction of dual wheel unit in which braking action is applied simultaneously to both inner and outer wheels through the actuation of the brake shoes 23 and 23a acting upon the brake drum for the inner wheel C and the actuation simultaneously therewith of the brake shoes 24 upon the brake drum for the outer wheel A.

It will be readily understood that under various conditions of travel of the vehicle to which dual wheel units of the invention are applied one of the wheels A or C will rotate to a greater extent than the other at a particular time. For example, when the vehicle is making a left turn, the outer wheel A of the dual wheel unit on the left side thereof may remain substantially stationary, or only rotate slightly, while the inner wheel C of said unit A will rotate to a greater degree.

It is clear, therefore, that if the brakes are applied under such condition there will be produced a substantially greater amount of friction upon the brake shoes 23 and 23a and the brake drum 5 causing greater wear of these parts. This, of course, merely illustrates one condition under which the cooperating braking elements of one wheel may be caused to wear more than the corresponding cooperating braking elements of the other wheel. If the dual wheel unit has been in use for sometime, therefore, the brake shoes cooperating with one of the drums will be spaced farther from said drum than will the brake shoes cooperating with the other drum be spaced from said drum. Nevertheless, because of the fluid interconnection between the operating cylinders 36 and 37, the brake action will be automatically equalized when the brakes are applied to compensate for non-uniformity of wear of the respective cooperating braking elements.

Figure 5:
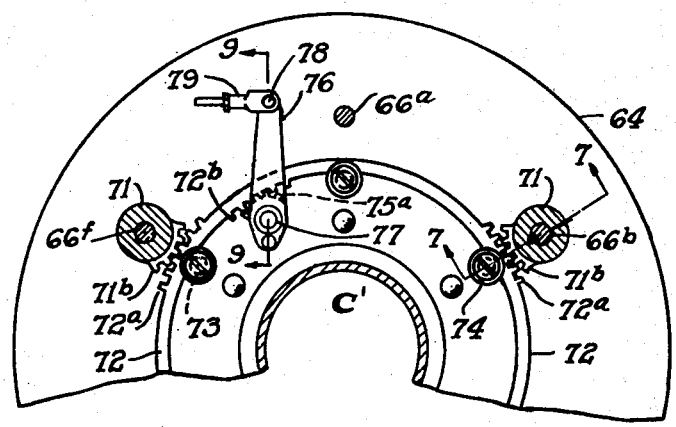
Figure 5 is a view taken on the line 5—5 of Figure 4, certain of the parts being shown in section.
Figure 6:
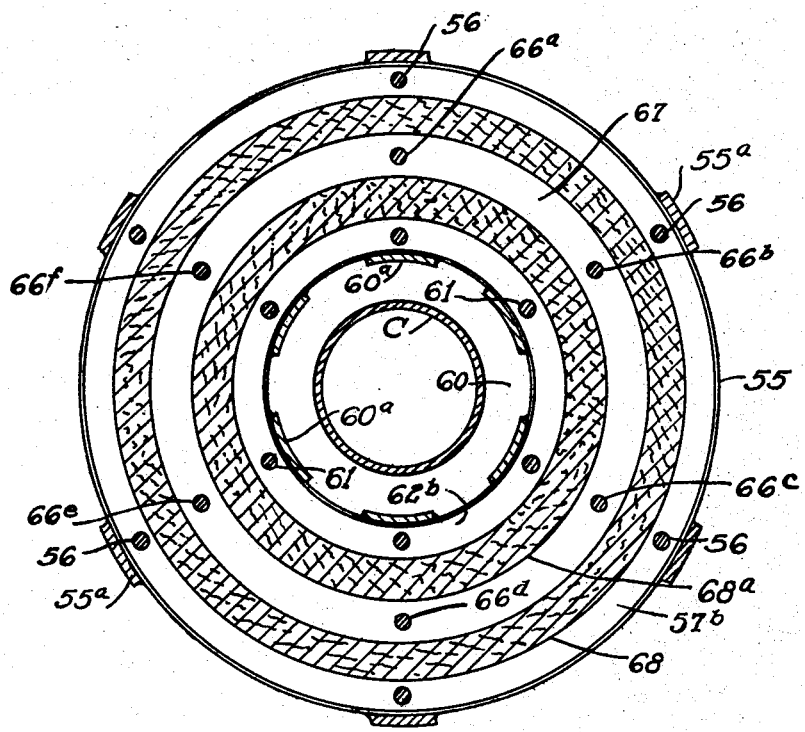
Figure 6 is a view taken on the line 6—6 of Figure 4, certain of the parts being shown in section, and the rim omitted.
Figure 9:
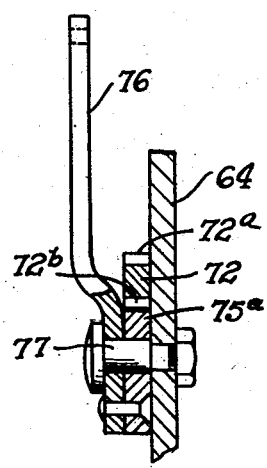
Figure 9 is a sectional view taken on the line 9—9 of Figure 5.
Figures 7, 8:
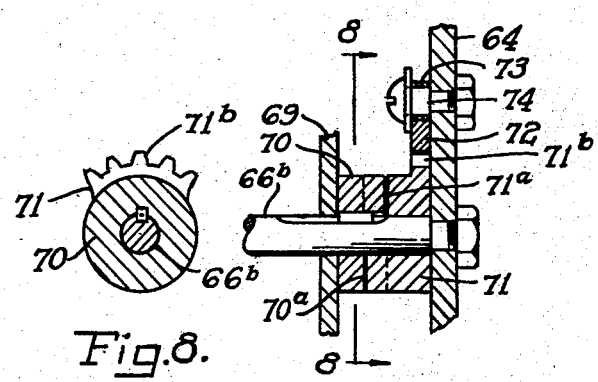
Figure 7 is a sectional view taken on the line 7—7 of Figure 5.
Figure 8 is a sectional view taken on the line 8—8 of Figure 7.

The form of the invention disclosed in Figures 4 to 9 of the drawings will now be described in detail. The wheel unit shown in Figures 4 to 9 comprises an outer wheel A', mounted for rotation about the axle C' of a vehicle, not shown. D represents the inner wheel of the unit mounted for rotation about the hub of the wheel A' in the same manner described in reference to the wheel C of the construction shown in Figures 1 to 3.

The wheels A' and D of the form of the invention now being described are of substantially the same construction, except in reference to the details of the brake mechanism, as the wheels A and C of the form of the invention disclosed in Figures 1 to 3. In Figures 4 to 9, therefore, parts of the construction which are similar to corresponding parts of the construction shown in Figures 1 to 3 are indicated by corresponding reference numerals, the same, however, being designated by a prime exponent. The parts of the construction of Figures 4 to 9, which are similar to parts of the construction of Figures 1 to 3, and referred to by corresponding numerals, will not, therefore, be specifically described.

Secured to the inner wheel spider 16' is a ring 55 having a plurality of spaced lugs 55a flanged as at 55b. A pin 56 extends between the ring 55 and the flanged portion 55b of each of said lugs, the reduced ends 56a of said pins being journaled in the flange 55b to position the said pins 56 axially respecting said ring. Mounted upon said pins 56 are plates 57a, 57b and 57c. Said plates are maintained in spaced relation by coil springs 58 and 58a surrounding the pins 56 intermediate the plates 57a and 57b, and 57b and 57c respectively. Sleeves 59 are provided on the pins 56, extending between the plate 57a and the ring 55 to position said plates 57a, 57b and 57c axially respecting said pins.

Secured at the inboard edge of the hub portion 3' of the outer wheel A' is a ring 60 having a plurality of spaced lugs 60a flanged as at 60b. A pin 61 extends between the ring 60 and the flanged portion 60b of each of said lugs, the reduced ends 61a of said pins being journaled in the flange 60b to position the said pins 61 axially respecting the ring 60. Mounted upon the pins 61 are spaced plates 62a, 62b and 62c, the same being maintained in spaced relation by coil springs 62d and 62e mounted upon the pins 61 intermediate the plates 62a and 62b, and 62b and 62c respectively. Sleeves 63 are mounted upon pins 61 between the plate 62a and the ring 60 to position the said plates 62a, 62b and 62c axially respecting said pins. The plates 57a, 57b and 57c and plates 62a, 62b and 62c extend circumferentially about the vehicle axle C'.

A brake backing plate 64, non-rotatably secured to the axle C', as at 65, has non-rotatably secured thereto a plurality of shafts 66a, 66b, 66c, 66d, 66e and 66f, upon which a plate 67 extending circumferentially about said axle C' and arranged intermediate plates 57a and 57b, and also intermediate plates 62a and 62b. Similarly mounted upon said shafts 66a, 66b, 66c, 66d, 66e and 66f is a plate 67a extending circumferentially about said axle C' and arranged intermediate plates 57b and 57c, and also intermediate plates 62b and 62c. The plates 67 and 67a are slidable axially respecting said shafts 66a, 66b, 66c, 66d, 66e and 66f, and are provided with brake lining 68 and 68a respectively secured to the opposing faces of said plates 67 and 67a.

Also mounted upon said shafts 66a, 66b, 66c, 66d, 66e and 66f, and extending circumferentially about the vehicle axle C', is a plate 69 adapted to engage the inboard faces of plates 57c and 62c. Mounted upon the shafts 62b, 62d and 62f are cooperating cam members 70 and 71, provided respectively with cooperating cam faces 70a and 71a respectively. The cam members 70 are slidable axially respecting the shafts 66b, 66d and 66f but keyed thereto so as to be non-rotatable respecting the same. The cam members 71 are rotatably mounted upon the shafts 66b, 66d and 66f. The cam members 71 are provided with toothed sectors 71b cooperating with adjacent toothed sectors 72a of a ring 72 extending circumferentially about the vehicle axle C' and mounted for limited rotation thereabout upon rollers 73 rotatably journaled upon bolts 74 secured to the brake backing plate 64.

The ring 72 is also provided with a toothed sector 72b for cooperation with a toothed sector 75a secured to a lever 76 pivoted to the brake backing plate 64, as by a pivot pin 77. The lever 76 is pivotally connected, as at 78, to the usual actuating linkage 79 for operation of the same from the vehicle upon which the dual wheel unit is mounted.

In operation, when it is desired to apply braking action to the wheels A' and D of the form of the invention just described, the actuating linkage 79 will be operated to move the lever 76 about its pivot 77, causing rotation of the ring 72 by cooperation of the toothed sectors 75a and 72b.

Rotation of the ring 72 will cause corresponding rotation of the cam members 71. By reason of the cooperation of the cam faces 70a and 71a of the cam members 70 and 71, the cam members 70 will be caused to move axially along the shafts 66b, 66d and 66f, away from the brake backing plate 64 causing corresponding movement of the plate 69. This will, in turn, cause the plates 67 and 67a to be compressed between the plates 57a, 57b, 57c, and 62a, 62b, 62c, connected respectively as above described with the inner wheel D and the outer wheel A', to retard rotation of said wheels.

Having thus described my invention, what I claim as new and desire to secure by Letters Patent of the United States is:

1. In a device of the class described, in combination, a wheel unit comprising a pair of independently rotatable wheels, a member associated with each of said wheels to rotate therewith and axially movable respecting the same, a non-rotatable member axially movable respecting said other members for engagement therewith, and means for moving certain of said members axially respecting other of said members to engage the same frictionally and thereby retard rotation of said wheels.

2. In a device of the class described, in combination, a wheel unit comprising a pair of independently rotatable wheels, plural sets of brake members one of which sets is associated with one of said wheels to rotate therewith and another of which sets is associated with the other of said wheels to rotate therewith, means for normally positioning individual members of each set in spaced relation to the other members of said set axially respecting said wheels, brake means held against rotation and comprising a member positioned intermediate individual members of both sets, and means for moving certain of said members axially to engage the same frictionally and thereby retard rotation of said wheels.

3. In a device of the class described, in combination, a wheel unit comprising a pair of independently rotatable wheels, a member associated with each of said wheels to rotate therewith and axially movable respecting the same, a non-rotatable member axially movable respecting said other members for engagement therewith, and means for moving certain of said members axially respecting other of said members to engage the same frictionally and thereby retard rotation of said wheels, said last means comprising a pair of elements associated with said members having cooperating cam faces one of said cam members being non-rotatable and the other rotatable, means for preventing axial movement of the latter in one direction, and means for rotating same to cause axial movement of the non-rotatable member in an opposite direction.

4. In a device of the class described, in combination, a wheel unit comprising a pair of independently rotatable wheels, a member associated with each of said wheels to rotate therewith and axially movable respecting the same, a non-rotatable member axially movable respecting said other members for engagement therewith, and means for moving certain of said members axially respecting other of said members to engage the same frictionally and thereby retard rotation of said wheels, said last means comprising plural sets of cooperating cam elements associated with said members at spaced points, said sets comprising rotatable members having toothed portions, and rotatable means interconnecting said rotatable members and comprising cooperating toothed portions, and means for rotating said rotatable means.

5. In a device of the class described, a wheel unit comprising a pair of independently rotatable wheels, a drum associated with each of said wheels to rotate therewith, a plate carried by each of said drums and axially movable respecting the same, a non-rotatable plate axially movable respecting said other plates for engagement therewith, and means for moving certain of said plates axially respecting other of said plates to engage the same frictionally and thereby retard rotation of said wheels.

6. In a device of the class described, in combination, a wheel unit comprising a pair of independently rotatable wheels, one of the same being journaled on the hub of the other for rotation thereabout, a pair of concentric drums one of which is secured to said latter wheel to rotate therewith and the other of which drums is secured to said hub to rotate therewith, a plate associated with each of said drums to rotate therewith and axially movable respecting the same, a non-rotatable plate positioned intermediate said drums and axially movable respecting said other plates for engagement therewith, and means for moving certain of said plates axially respecting other of said plates to engage the same frictionally and thereby retard rotation of said wheels.

7. A wheel unit comprising a pair of separately rotatable wheels, an axle at one end of which said unit is supported, and an axially operable brake device common to said wheels, said device comprising an element associated with each wheel for rotation therewith respectively, and a non-rotatable element engageable with said other elements.

8. A wheel unit comprising a pair of separately rotatable wheels, an axle at one end of which said unit is supported, a multiple disk brake associated with the wheel unit, said brake comprising a disk associated with each wheel for rotation therewith respectively, and a non-rotatable element engageable with said disks for applying braking force simultaneously to both wheels.

9. In a device of the class described, in combination, a wheel unit comprising a pair of independently rotatable wheels, a brake member associated with one of said wheels to rotate therewith, a second brake member associated with the other wheel to rotate therewith, and an element held against rotation, said members and said element being axially movable relatively for frictional interengagement to retard rotation of said wheels.

10. In a device of the class described, in combination, a wheel unit, comprising a pair of independently rotatable wheels, a member associated with each of said wheels to rotate therewith and axially movable respecting the same, a non-rotatable member axially movable respecting said other members for engagement therewith, and means for moving certain of said members axially respecting other of said members to engage the same frictionally and thereby retard rotation of said wheels, said last means comprising plural sets of cooperating cam elements associated with said members at spaced points and means interconnecting said sets of cam members for simultaneous operation thereof.

11. A device as claimed in claim 9 wherein each of said brake members comprises a plurality of normally spaced axially movable discs, and wherein said element comprises a plurality of normally spaced axially movable discs, certain of the latter discs being disposed axially intermediate certain of the former discs for frictional engagement therewith upon relative axial movement thereof.

12. A device as claimed in claim 9 wherein each of said brake members comprises a disc rotatable with its respective wheel, said discs being relatively rotatable concentrically in a common radial plane, and wherein said non-rotatable element comprises a disc engageable with said first-mentioned discs.

13. A device as claimed in claim 9 wherein each of said brake members comprises a set of normally spaced axially movable discs, said sets of discs being relatively rotatable concentrically and each disc normally disposed in a radial plane common to that of a disc of the other set, and wherein said element comprises a plurality of normally spaced axially movable discs, certain of the latter discs being disposed axially intermediate certain of the former discs for frictional engagement therewith upon relative axial movement thereof.

ELMER L. MILLER.